United States Patent [19]

Reed

[11] 4,422,429

[45] Dec. 27, 1983

[54] FUEL HEATER

[76] Inventor: Morgan P. Reed, 700 South Eastern, Rayne, La. 70578

[21] Appl. No.: 379,008

[22] Filed: May 17, 1982

[51] Int. Cl.³ .................... F02M 31/00; F02M 27/00
[52] U.S. Cl. .................................. 123/557; 123/538; 123/552
[58] Field of Search ............... 123/557, 552, 537, 538

[56] References Cited

U.S. PATENT DOCUMENTS

| | | | |
|---|---|---|---|
| 3,116,726 | 1/1964 | Kwartz | 123/538 |
| 4,003,356 | 1/1977 | Naylor | 123/557 |
| 4,050,426 | 9/1977 | Sanderson | 123/538 |
| 4,072,138 | 2/1978 | Hawkins | 123/557 |
| 4,367,717 | 1/1983 | Ray | 123/557 |

Primary Examiner—Ronald H. Lazarus
Attorney, Agent, or Firm—Harvey B. Jacobson

[57] ABSTRACT

An elongated hollow body is provided defining a first central passage extending longitudinally therethrough and first inner, second intermediate and third outer elongated annular chambers disposed about the passage, first chamber and second chamber, respectively. The body includes wall portions constructed of good heat transfer materials separating adjacent chambers and the first chamber from the passage. The passage includes opposite liquid fuel inlet and outlet ends and a plurality of small diameter passages communicate longitudinally spaced portions of the central passage with the first chamber. The second chamber includes manifold vacuum air inlet and outlet structure opening thereinto and the third chamber includes liquid engine coolant inlet and outlet structure opening thereinto. In addition, a pair of opposite side bar magnets extend along the wall portions of the body separating the first and second chambers. Heat is applied to the heater by engine coolant flowing through the third chamber, the heating capacity of the third chamber is modulated by manifold vacuum air passing through the second chamber and the first chamber surrounding the central fuel passage serves as an expansion chamber for fuel vapors and to further modulate the heating of the fuel passing through the central fuel passage by the engine coolant.

8 Claims, 3 Drawing Figures

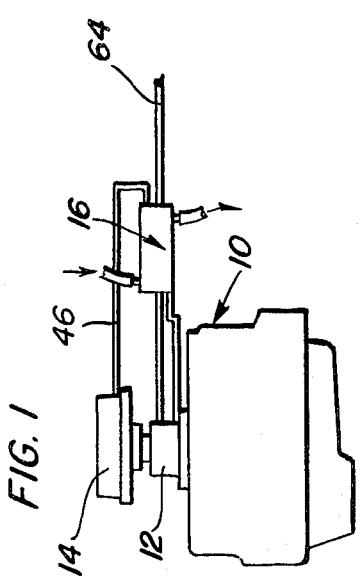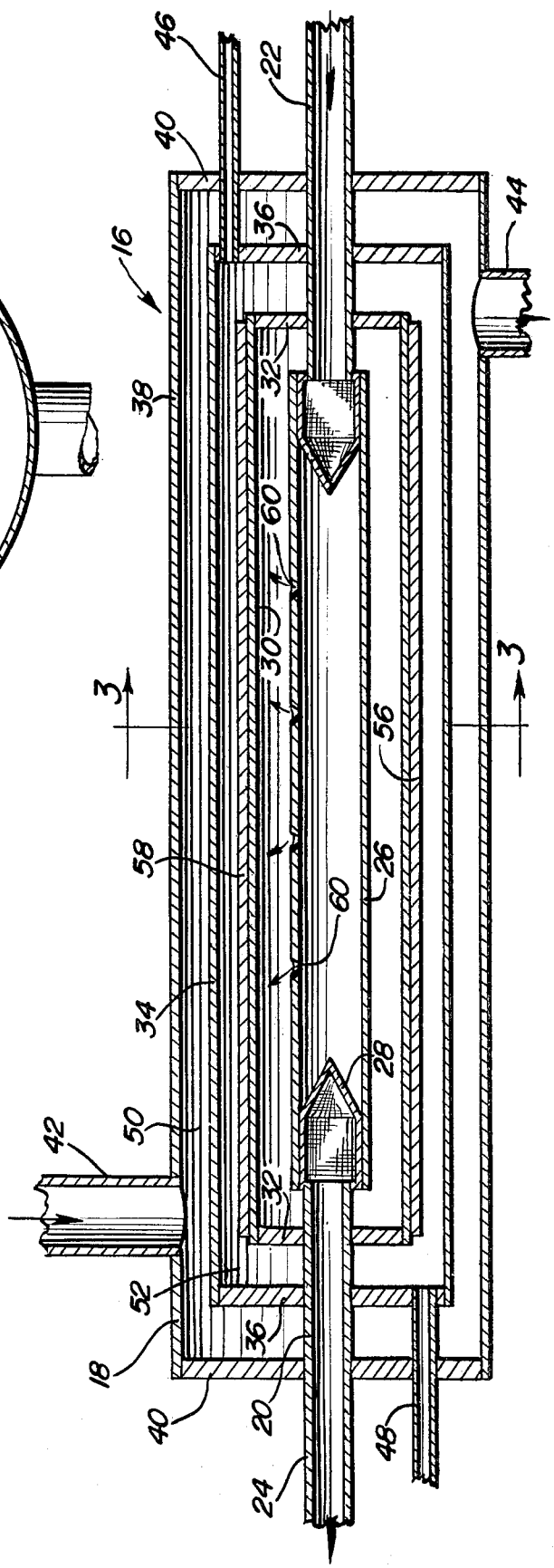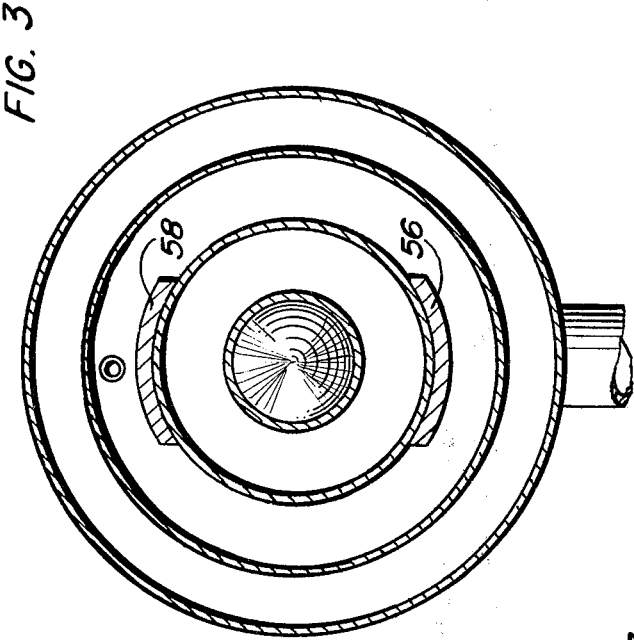

FUEL HEATER

BACKGROUND OF THE INVENTION

Various forms of fuel heaters heretofore have been provided to increase fuel efficiency operation of existing internal combustion engines utilizing liquid fuel. However, most of these previously known forms of heaters either provide too much heat to the fuel being heated or insufficient heat during various different periods of engine operation. Further, while some forms of fuel heaters include precise controls therefor whereby reasonably constant heating of fuel may be accomplished, these latter types of fuel heaters are relatively complex and incorporate heating controls which are subject to malfunction. Accordingly, a need exists for a simplified form of fuel heater capable of heating engine fuel to substantially the desired temperature during operation of the associated combustion engine under different climatic conditions.

Examples of previously known forms of fuel heaters, including some of the general structural and operational features of the instant invention, are disclosed in U.S. Pat. Nos. 1,168,111, 1,318,265, 2,231,525, 4,050,426, 4,218,999, 4,233,945 and 4,248,197.

SUMMARY OF THE INVENTION

The fuel heater of the instant invention includes a central fuel passage and first, second and third annular concentric chambers disposed about the fuel passage with the first chamber being closed and enjoying minimum communication with the fuel passage and with no communication between the second chamber and the first chamber and between the third chamber and the second chamber. The second chamber includes air inlet and air outlet structure whereby a portion of induction air of the associated engine may be drawn through the second chamber and the third chamber includes liquid coolant inlet and outlet structure whereby a portion of the engine coolant of the associated engine may pass through the third chamber.

The main object of this invention is to provide a fuel heater for a combustion engine which utilizes engine coolant as a heating source and which therefore has a substantially constant amount of heat supplied to the fuel heater after operating temperatures of the associated engine have been reached.

Another object of this invention is to provide a fuel heater in accordance with the preceding object and including structure operative to compensate for small quantities of liquid fuel which may be vaporized as a result of the fuel being heated in the heater.

Yet another important object of this invention is to provide a heater constructed in a manner whereby the heating of fuel passing therethrough may be modulated as a result of insulation in the form of engine induction air passing between the coolant heating surfaces of the heater and the wall portions of the passage of the heater through which engine fuel to be heated passes.

Another object of this invention is to provide a fuel heater which, other than being supplied with a continuous flow of engine coolant therethrough, is self-contained and does not require any heating controls.

A final object of this invention to be specifically enumerated herein is to provide a fuel heater in accordance with the preceding objects and which will conform to conventional forms of manufacture, be of simple construction and automatic in operation, so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic view of a typical combustion engine with which the fuel heater of the instant invention is operatively associated;

FIG. 2 is an enlarged longitudinal vertical sectional view of the fuel heater; and FIG. 3 is a transverse vertical sectional view on somewhat of an enlarged scale, taken substantially upon the plane indicated by the section line 3—3 on FIG. 2.

DETAILED DESCRIPTION OF THE INVENTION

Referring now more specifically to the drawings, the numeral 10 generally designates a conventional form of combustion engine including a carburetor 12 having an air cleaner 14 mounted thereon. Further, it is to be noted that the engine 10 is of the liquid cooled type and has a conventional radiator (not shown) operatively associated therewith and also includes a thermostat (not shown) for controlling the flow of engine coolant through the engine 10.

The heater of the instant invention is referred to in general by the reference numeral 16 and defines an elongated hollow body 18. The body 18 includes a central cylindrical tube 20 extending longitudinally therethrough and including inlet and outlet ends 22 and 24 disposed exteriorly of the body 18. The central portion of the tube 20 is diametrically enlarged as at 26 and includes opposite end screen-type filters 28 and 30.

The central portion 26 is enclosed within a cylindrical housing 30 disposed thereabout including opposite end walls 32 through which the inlet and outlet portions 22 and 24 extend and the housing 30 is enclosed within a second cylindrical housing 34 substantially concentric with the housing 30 and including end walls 36 through which the inlet and outlet end portions 22 and 24 extend. Finally, a third outer cylindrical housing 38 is disposed about the housing 34 and includes end walls 40 through which the inlet and outlet end portions 22 and 24 extend.

The outer housing 38 includes inlet and outlet fittings 42 and 44 through which liquid coolant from the engine 10 may enter and exit from the interior of the housing 38 and the intermediate housing 34 includes an inlet 46 and an outlet 48 through which a portion of the induction air for the engine 10 may enter and exit from the interior of the housing 34, the inlet 46 and outlet 48 passing through the end walls 40 of the outer housing 38.

It is to be noted that the inlet fitting 42 will be appropriately connected to the liquid coolant passages or radiator hoses of the engine 10 and that the outlet fitting 44 will also be similarly connected to the coolant passages of the engine 10 or the heater hoses thereof in a manner such that during operation of the engine 10 liquid coolant will pass through the third outer chamber 50 disposed between the housings 34 and 38. In addition, the inlet 46 will be operatively connected to the air filter 14 and the outlet 48 will be operatively connected to a vacuum port on the carburetor 12 (or to the induction passages of the manifold of the engine 10) in order that a portion of the induction air of the engine 10 will pass through the intermediate chamber 52 disposed between the housing 34 and the housing 30 during operation of the engine 10.

Diametrically opposite outer sides of the housing 30 have elongated bar magnets 56 and 58 mounted thereon which are arcuate in transverse cross section and thereby conform to the outer curvature of the housing 30. The bar magnets 56 and 58 are thus disposed in the chamber 52. Further, the central portion 26 of the tube 20 includes longitudinally spaced radial bores 60 formed therein, whereby limited communication between the upper portion of the interior of the central portion 26 or the tube 20 and the upper portion of the interior of the housing 30 is provided.

In operation, the heater 16 is installed by serially connecting the tube 20 in the existing fuel line 64 leading to the carburetor of the engine 10 and by serially connecting the inlet 46 and outlet 48 for the chamber 52 in a vacuum line 64 extending between the air cleaner 14 and a vacuum port of the carburetor 12 or the intake manifold of the engine 10. Also, the inlet fitting may be connected to the heater hose extending to the associated vehicle heater through the utilization of a T-fitting and the outlet fitting 44 may be connected to the heater hose extending from the heater to the engine through the utilization of a second T-fitting. However, if the heater 16 is to be used in cold climates in which the heater of the associated vehicle is substantially always in operation, the inlet and outlet fittings 42 and 46 may be serially connected in either of the heater hoses.

As heated coolant from the engine 10 passes through the outer chamber 50, the housing 34 is heated and the heated housing 34 functions to heat the housing 30 by radiant heat. The flow of a portion of the induction air through the chamber 52 modulates the amount of heating of the housing 30 may be accomplished by heating of the housing 34 by liquid coolant passing through the chamber 50 and the heated housing 30 in turn heats the enlarged central portion 26 of the tube 20 by radiation. Thus, the fuel flowing through the tube 20 is heated in addition to being filtered by the screen filters 28 and 30.

The ports or bores 60 enable any fuel which is vaporized by the heating process to pass from within the central portion 26 into the interior of the housing 30, thus preventing vapor locks. However, after a quantity of vaporized fuel has been received in the housing 30 through the ports 60 and operation of the engine 10 is terminated, the vaporized fuel within the housing 30 may condense back into liquid fuel and again be drawn into the central portion 26 of the tube 20 after the liquid level of condensed fuel within the housing 30 reaches the level of the ports 60.

Because of the modulating effect of heating of the housing 30 by a portion of the induction air passing through the chamber 52, excessive heating of fuel passing through the central portion 26 is avoided. In addition, the magnets 56 and 58 serve to trap ferrous impurities flowing to the heater 16 through the tube 20 and also, apparently, have an effect on the fuel passing through the heater 16 to the carburetor 12 to enhance the ability of the fuel to be vaporized by the carburetor 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an internal combustion engine including a fuel supply line, liquid coolant flow passages, and a manifold vacuum source, wherein the improvement comprises: a fuel heater for use in heating liquid fuel, said heater including an elongated hollow body defining a first central passage extending therethrough and first inner, second intermediate and third outer chambers disposed about said passage, first chamber and second chamber, respectively, with heater body wall portions of good heat transfer materials separating adjacent chambers and said first chamber from said passage, said passage including opposite liquid fuel inlet and outlet ends, a plurality of small diameter passages communicating longitudinally spaced portions of said passage with said first chamber, said second chamber including manifold vacuum air inlet and outlet means opening thereinto and said third chamber including liquid engine coolant inlet and outlet means opening thereinto.

2. The invention of claim 1 wherein said passage is substantially fully enclosed within said first chamber and said first and second chambers are substantially fully enclosed within said second and third chambers.

3. The invention of claim 2 wherein said first central passage includes axially spaced fuel filtering means disposed therein.

4. The invention of claim 2 wherein said second chamber includes magnetic means disposed therein supported from the external surfaces of said heater body wall portions defining said first inner chamber.

5. The invention of claim 1 including an auxiliary induction air inlet port, said outlet of said second intermediate chamber being operatively connected to said auxiliary induction air inlet port, said fuel inlet and outlet ends of said passage being serially connected in said fuel line and said liquid engine coolant inlet and liquid engine coolant outlet means of said third chamber being serially connected in one of said liquid engine coolant flow passages.

6. The invention of claim 1 wherein said elongated first central passages comprises a substantially straight cylindrical passage and said first, second and third chambers comprise successively larger diameter annular chambers disposed about said central passage, said first chamber and said second chamber, respectively.

7. The invention of claim 6 wherein said second chamber manifold vacuum air inlet and manifold vacuum air outlet means open into opposite end portions of said second chamber and said third chamber liquid engine coolant inlet and outlet means open into opposite end portions of said third chamber.

8. The invention of claim 7 wherein said first central passage includes axially spaced fuel filtering means disposed therein.

* * * * *